United States Patent
Yamaguchi

(10) Patent No.: US 8,593,531 B2
(45) Date of Patent: Nov. 26, 2013

(54) IMAGING DEVICE, IMAGE PROCESSING METHOD, AND COMPUTER PROGRAM

(75) Inventor: Tadashi Yamaguchi, Saitama (JP)

(73) Assignee: Sony Corporation, Tokyo (JP)

( * ) Notice: Subject to any disclaimer, the term of this patent is extended or adjusted under 35 U.S.C. 154(b) by 8 days.

(21) Appl. No.: 13/267,112

(22) Filed: Oct. 6, 2011

(65) Prior Publication Data

US 2012/0133787 A1 May 31, 2012

(30) Foreign Application Priority Data

Nov. 25, 2010 (JP) ................. 2010-262068

(51) Int. Cl.
- H04N 5/228 (2006.01)
- H04N 5/232 (2006.01)
- G06K 9/40 (2006.01)
- G02F 1/01 (2006.01)
- G02B 21/00 (2006.01)

(52) U.S. Cl.
USPC ........ 348/208.4; 348/352; 348/349; 348/345; 359/279; 359/383; 382/255; 382/254

(58) Field of Classification Search
USPC ......... 348/208.99, 208.1–208.13, 208.4, 326, 348/345–3.51, E9.035, 241, 243, 352, 50, 348/340, 338, 345–351; 382/254, 255, 264, 382/263; 359/319, 383, 410, 279; 396/56
See application file for complete search history.

(56) References Cited

U.S. PATENT DOCUMENTS

| | | | |
|---|---|---|---|
| 8,184,197 B2 * | 5/2012 | Deng et al. | 348/345 |
| 2007/0065127 A1 * | 3/2007 | Suda | 396/52 |
| 2011/0304765 A1 * | 12/2011 | Yogo et al. | 348/345 |
| 2012/0147150 A1 * | 6/2012 | Kojima et al. | 348/50 |

FOREIGN PATENT DOCUMENTS

| | | |
|---|---|---|
| JP | 2001-16493 | 1/2001 |
| JP | 2010-224112 | 10/2010 |

* cited by examiner

*Primary Examiner* — Nhan T Tran
*Assistant Examiner* — Marly Camargo
(74) *Attorney, Agent, or Firm* — Oblon, Spivak, McClelland, Maier & Neustadt, L.L.P.

(57) ABSTRACT

An imaging device includes: a first imaging unit which does not include a phase difference detecting pixel on an imaging element; a second imaging unit which includes a phase difference detecting pixel on an imaging element; a pixel comparing unit which compares first obtained image obtained by the first imaging unit with a second obtained image obtained by the second imaging unit; a correcting unit which corrects phase difference information obtained by the second imaging unit based on a comparison result by the image comparing unit; a phase difference applying unit which applies the phase difference information corrected by the correcting unit to the first obtained image; and a recording unit which records image information.

10 Claims, 13 Drawing Sheets

IMAGING DEVICE, IMAGE PROCESSING METHOD, AND COMPUTER PROGRAM

BACKGROUND

The present disclosure relates to a an imaging device, provided with a plurality of imaging elements, an image processing method, and a computer program, and particularly to an imaging device, an image processing method, and a computer program, which associates a captured image obtained by the imaging elements.

A digital camera which digitally coding an image captured by an image sensor constituted by solid-state imaging elements such as a CCD (Charge Coupled Device), a CMOS (Complementary Metal Oxide Semiconductor), or the like has been widely distributed in stead of a silver salt camera which captures image with the use of a film or a photographic plate. A digital camera has advantages in that it is possible to store the digitally coded image on a memory and perform image processing and image management thereon by a computer and in that there is no concern of a life span of a film.

Some imaging elements have a function of detecting phase difference information. It is possible to detect a focus state of an imaging lens based on the phase difference in a pair of image signals output from a specific photoelectric conversion unit (photodiode).

Although a person who is not skilled in imaging intensely moves a camera due to the unfamiliarity with operations (for example, strong hand shaking) in many cases, many digital cameras mount an image stabilization function. The image stabilization function includes an electronic image stabilization for correction by image processing on the image sensor and mechanical image stabilization for correction with an optical lens.

The electronic image stabilization is a correcting method in which an effective pixel region extracted as a captured image from a maximum pixel region which can be captured is moved in accordance with the amount of image stabilization. According to the electronic image stabilization, although it is not necessary to mount a special mechanism, there is a disadvantage in that the light receiving area of the imaging elements is not effectively used.

On the other hand, the mechanical image stabilization function can be realized by sending feedback of a hand shaking vector measured with the use of a gyro sensor or an acceleration sensor to a mechanical system and performing high-speed control so as not to generate in the image projected to the image sensor. As the mechanical system described herein, a lens, a prism, and an imager (or a module integrated with an imager) are exemplified and respectively referred to as a "lens shift", a "prism shift" and an "imager shift". According to the image stabilization based on the lens shift scheme, it is necessary to embed a special mechanism which drives a specific lens, and the costs becomes higher since it becomes difficult to design the camera lens due to the increased size. On the other hand, the image stabilization based on the imager shift scheme, it is possible to perform the image stabilization with all camera lenses which can be installed on the camera main body, and it is not necessary to design a special camera lens.

Recently, many digital cameras are provided with a plurality of image capturing units. For example, a camera device which is provided with a branching unit which branches an optical path into a plurality of optical paths and a plurality of imaging elements disposed at an image forming position of each optical path, configured to output video signals of images with different image angle sizes from each of the imaging elements by differentiating the imaging sizes of the imaging elements, and capable of independently obtaining video signals of images with a plurality of image angles has been proposed (see Japanese Unexamined Patent Application Publication No. 2003-304115, for example).

In addition, an imaging device which is provided with a sub imaging element which captures the auxiliary captured image such as an object image to be displayed as a live view on the finder window as well as a main imaging element which captures a main captured image has been proposed (see Japanese Unexamined Patent Application Publication No. 2010-224112, for example). A user can check framing or the like while viewing the auxiliary captured image at the time of capturing an image.

It is expected to provide new applications for the digital camera provided with a plurality of imaging units by associating the captured image obtained by each imaging unit.

While the main imaging element has high pixels for capturing a stationary image, however, the sub imaging element has low pixels since the auxiliary image is captured mainly for a live view, namely a moving image. That is, it is difficult to associate both captured images since the screen sizes, the number of pixels, and pixel pitches are different in each imaging element. In addition, the image capturing timing does not completely coincide due to different frame rates resulting from the difference in the number of pixels of both imaging elements. Accordingly, if the hand shaking of the person, who captures an image, at the time of capturing image is faster than the timing of obtaining the image, it becomes difficult to take an action between the captured images in some cases.

In addition, a space in the camera main body, in which the aforementioned image stabilization mechanical system can be disposed, is limited, and the image stabilization mechanism based on the imager shift scheme is generally installed only on the side of the main imaging element. If image stabilization is performed on only one side of the imaging elements, it further becomes difficult to associate between captured images. In addition, it is difficult to associate between captured images even if the image stabilization mechanisms are installed in both imaging elements, due to a correction error, a computation error of a displacement amount of the imaging elements, and a displacement error.

SUMMARY

It is desirable to provide an excellent imaging device, an image processing method, and a computer program capable of preferably associating and storing captured images obtained by each of a plurality of imaging elements at a pixel level.

It is also desirable to provide an excellent imaging device, an image processing method, and a computer program capable of solving deviation between captured images resulting from the differences in image sizes, the number of pixels, the pixel pitches, image capturing timing inconsistency of each of imaging elements, application of image stabilization to only a part of imaging elements, and the like and preferably associating and recording each captured image at a pixel level.

According to a first embodiment of the present disclosure, there is provided an imaging device including: a first imaging unit which does not include a phase difference detecting pixel on an imaging element; a second imaging unit which includes a phase difference detecting pixel on an imaging element; a pixel comparing unit which compares first obtained image obtained by the first imaging unit with a second obtained image obtained by the second imaging unit; a correcting unit which corrects phase difference information obtained by the second imaging unit based on a comparison result by the image comparing unit; a phase difference applying unit which applies the phase difference information corrected by the correcting unit to the first obtained image; and a recording unit which records image information.

According to a second embodiment of the present disclosure, the recording unit of the imaging device according to the first embodiment may record the phase difference information with the image information.

According to a third embodiment of the present disclosure, the first imaging unit of the imaging device according to the first embodiment may be provided with a hand shaking correcting function while the second imaging unit may not be provided with the hand shaking correcting function. In addition, the image comparing unit may detect deviation between the first obtained image for which hand shaking has been corrected and the second obtained image for which hand shaking has not been corrected.

According to a fourth embodiment of the present disclosure, the second imaging unit of the imaging device according to the first embodiment may be provided with a hand shaking correcting function while the first imaging unit may not be provided with the hand shaking correcting function, and in addition, the image comparing unit may detect deviation between the second obtained image for which hand shaking has been corrected and the first obtained image for which hand shaking has not been corrected.

According to a fifth embodiment of the present disclosure, both the first and second imaging units of the imaging device according to the first embodiment may be provided with a hand shaking function. In addition, the image comparing unit may detect deviation between the first obtained image and the second obtained image resulting from correction error in hand shaking correction.

According to a sixth embodiment of the present disclosure, the imaging device according to the fifth embodiment may mount a hand shaking correcting function based on a imager shift scheme. In addition, the image comparing unit may detect deviation between the first obtained image and the second obtained image resulting from a computation error of a displacement amount or a displacement error of imaging elements at the time of hand shaking correction by the first and second imaging units.

According to a seventh embodiment of the present disclosure, the image comparing unit according to the fifth embodiment may detect deviation between images resulting from sizes of imaging elements, numbers of pixels, or pixel pitches of the first and second imaging units.

According to an eighth embodiment of the present disclosure, the image comparing unit of the imaging device according to the first embodiment may detect deviation between the first obtained image and the second obtained image resulting from a difference in obtaining timing of imaging elements in the first and second imaging units.

According to a ninth embodiment of the present disclosure, there is provided an image processing method including: comparing a first obtained image obtained by a first imaging unit which does not a phase difference detecting pixel on an imaging element with a second obtained image obtained by a second imaging unit which includes a phase difference detecting pixel on an imaging element; correcting phase difference information obtained by the second imaging unit based on a comparison result of image comparison; and applying the phase difference information corrected in the correction to the first obtained image.

According to a tenth embodiment of the present disclosure, there is provided a computer-readable computer program which causes a computer to execute: comparing a first obtained image obtained by a first imaging unit which does not a phase difference detecting pixel on an imaging element with a second obtained image obtained by a second imaging unit which includes a phase difference detecting pixel on an imaging element; correcting phase difference information obtained by the second imaging unit based on a comparison result of image comparison; and applying the phase difference information corrected in the correction to the first obtained image.

In the computer program according to the tenth embodiment of the present disclosure, the computer-readable computer program is defined so as to realize a predetermined process in the computer. In other words, by installing the computer program according to the tenth embodiment of the present disclosure in the computer, cooperative operation is achieved in the computer, and same effects as the imaging device according to the first embodiment of the present disclosure can be obtained.

According to the present disclosure, it is possible to provide an excellent imaging device, an image processing method, and a computer program capable of preferably associating and recording at a pixel level captured images obtained by a plurality of imaging elements by canceling the deviation between the captured images resulting from the differences in the screen sizes, the numbers of pixels, and the pixel pitches for each imaging element, inconsistency in image capturing timing, an application of hand shaking correction only to a part of the imaging elements, and the like.

According to the present disclosure, it is possible to provide an excellent imaging device, an image processing method, and a computer program capable of preferably associating and recording at a pixel level a captured image from the imaging element provided with a hand shaking correcting function with a captured image from the imaging element which mounts not the hand shaking correcting function but the phase difference detecting pixel by canceling the deviation between the captured images resulting from the differences in the screen sizes, the numbers of pixels, and the pixel pitches for each imaging element, inconsistency in image capturing timing, an application of hand shaking correction only to a part of the imaging elements, and the like.

According to the present disclosure, it is possible to apply phase information obtained by an imaging element provided with a phase difference detecting pixel to the other captured image without any deviation by referring to a captured image from any one of the imaging element without the phase difference detecting pixel and the imaging element with the phase difference detecting pixel, detecting to what extent the captured image from the other imaging element is deviated from the captured image to be referred, and performing position correction of the captured images based on the detection result.

According to the present disclosure, it is possible to apply phase information obtained by an imaging element provided with a phase difference detecting pixel to the other captured image without any deviation by referring to a captured image from the imaging element by which hand shaking correction based on the imager shift scheme has been performed, detecting to what extent the captured image from the imaging element with the phase difference detecting pixel is deviated from the captured image to be referred, and performing position correction of the captured images based on the detection result.

Other purposes, features, and advantages of the present disclosure will be clarified by more detailed description based on the embodiments of the present disclosure and the accompanying drawings.

DETAILED DESCRIPTION OF EMBODIMENTS

Hereinafter, detailed description will be given on an embodiment of the present disclosure with reference to the drawings.

Figure 1:
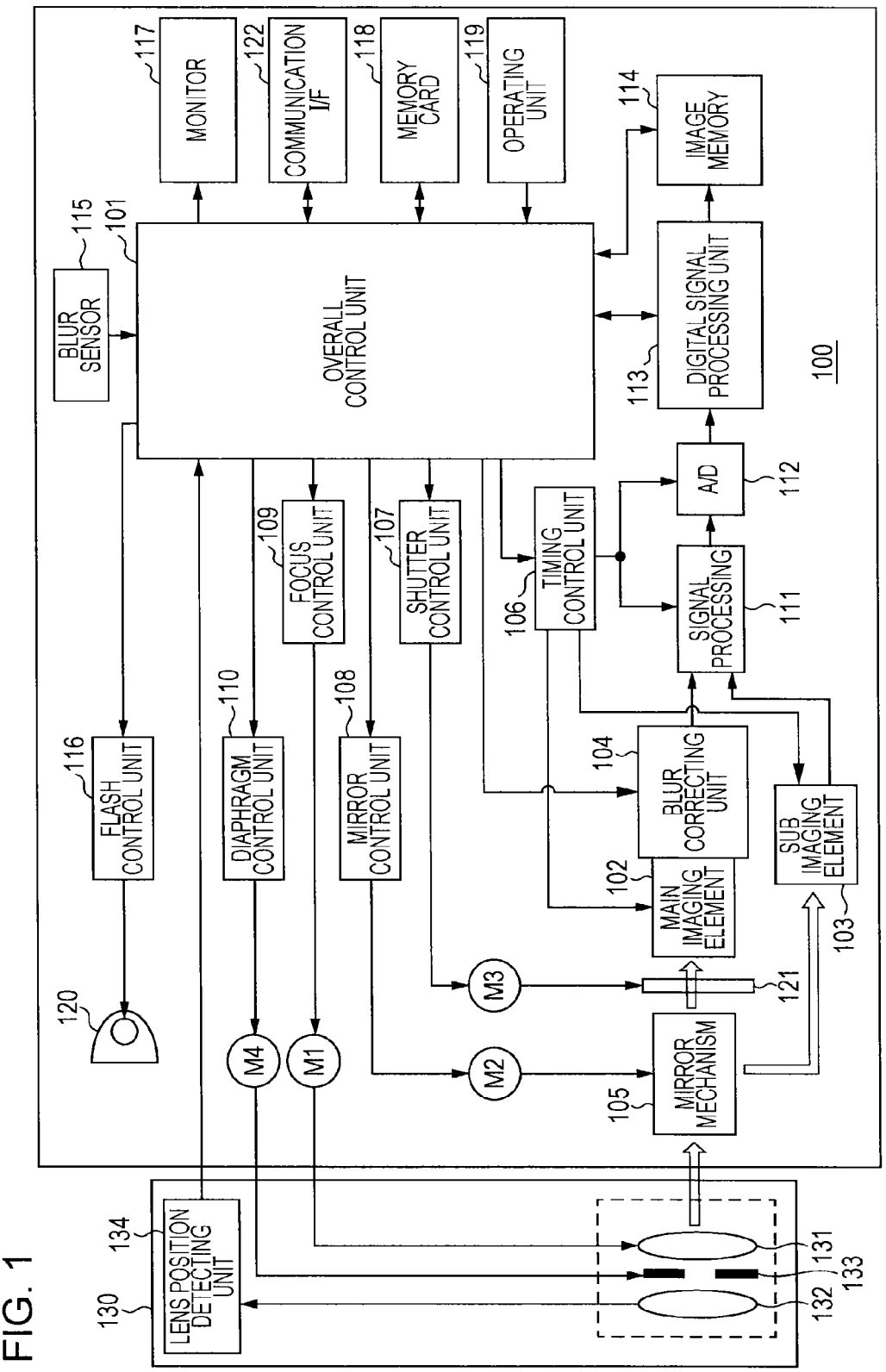
FIG. 1 is a diagram showing a configuration of an imaging device according to an embodiment.

FIG. 1 shows a configuration of an imaging device 100 according to an embodiment of the present disclosure. The imaging device 100 is provided with an overall control unit 101, a mirror mechanism 105, a shutter 121, a main imaging element 102, a sub imaging element 102, a signal processing unit 111, an A/D conversion circuit 112, a digital signal processing unit 113, an image memory 114, an operating unit 119, a timing control unit 106, a shutter control unit 107, a mirror control unit 108, a focus control unit 109, a diaphragm control unit 110, a flash control unit 116, a flash 120, a blur detecting sensor 115, a blur correcting unit 104, a monitor 117, a communication interface 122, and the like.

The operating unit 119 is constituted by various buttons including a release button (not shown) and switches. The overall control unit 101 executes various operations in response to the input operation performed on the operating unit by a person who captures an image.

The communication interface 122 realizes an interface protocol for connecting to the network such as Transmission Control Protocol/Internet Protocol (TCP/IP), and is capable of performing data transmission such as an image, to the external host such as a server.

The overall control unit 101 is a microcomputer provided with a CPU (Central Processing Unit), a RAM (Random Access Memory), a ROM (Read Only Memory), and the like. The overall control unit 101 realizes various functions by loading a program stored on the ROM and executing the program by the CPU. For example, the overall control unit 101 cooperates with the focus control unit 109 and the like based on a phase difference detecting signal (which will be described later) obtained by the sub imaging element 103 and performs focusing control operation by which the position of the focus lens 131 is controlled.

The focus control unit 109 displaces the position of the focus lens 131 included in the lens group of the imaging lens unit 130 on an optical axis by generating a control signal based on the input signal from the overall control unit 101 and driving the motor M1. In addition, the position of the focus lens is detected by a lens position detecting unit 134 and sent to the overall control unit 101 as position data of the focus lens.

The mirror control unit 108 controls the switching between a mirror up state in which the mirror mechanism 105 is retreated from the optical path and a mirror down state in which the optical path is blocked by generating a control signal based on the input signal from the overall control unit 101 and driving the motor M2.

The shutter control unit 107 controls opening and closing of the shutter 121 by generating a control signal based on the input signal from the overall control unit 101 and driving the motor M3.

The diaphragm drive control unit 110 controls the diaphragm diameter of the diaphragm 132 provided in the imaging lens unit 130 by generating a control signal based on the input signal from the overall control unit 101 and driving the motor M4.

The timing control unit 106 performs timing control of the main imaging element 102 and the sub imaging element 103 by generating a control signal based on the input signal from the overall control unit 101.

The mirror mechanism 105 is a half mirror and disposed on the optical path formed by a lens group 131 in the imaging lens unit 130 to divide the optical path into two paths. That is, the light transmitting through the half mirror forms an optical image on the main imaging element 102 while the light reflected by the half mirror forms an optical image on the sub imaging element 103.

The blur detecting sensor 115 detects blur given to the imaging device 100 due to hand shaking or the like. The blur detecting sensor 115 is provided with a pitch direction sensor which detects blur in the pitch direction and a yaw direction sensor which detects camera shaking in the yaw direction on the assumption of a two dimensional coordinate system in which the horizontal direction is represented by the x axis (pitch direction) and the direction perpendicular to the x axis is represented by the y axis (yaw direction). The pitch direction sensor and the yaw direction sensor (both of which are not shown) are gyro sensors (angular velocity sensor) to detect angular velocity of the blur in each direction. The amount of blur detected by the blur detecting sensor 115 is used in the image stabilization based on the imager shift scheme which will be described later.

The flash 120 is a light source used at the time of shortage of luminance of the object, and the flash control unit 116, and the overall control unit 101, and the like controls whether or not to turn on the flash 120, how long the flash 120 is turned on, and the like.

The imaging element 102 is an image sensor constituted by a solid-state imaging element such as a CCD, a CMOS, or the like, exposes the object light image formed on a light receiving surface via the lens group 131 in response to the drive control signals (an accumulation start signal and an accumulation completion signal) input from the timing control unit 106, and generates an image signal (an image signal for recording) relating to the main captured image. The main captured image may be any one of a stationary image and a moving image. The main imaging element 102 can obtain an image with a larger screen size and a large number of pixels as compared with the second imaging unit 104. The main imaging element 102 outputs the image signal to the signal processing unit 111 in response to the reading control signal from the timing control unit 106. In addition, the timing signal (synchronization signal) is input from the timing control unit 106 to the signal processing unit 111 and the A/D (analog/digital) conversion circuit 112.

The main imaging element 102 is supported by the blur correcting unit 104 so as to be capable of displacing in a two dimensional manner on the plane perpendicular to the optical axis of the imaging lens unit 130. Specifically, it is possible to change the position of the main imaging element 102 in the direction parallel to the Y axis and the direction parallel to the X axis by a yaw direction actuator and a pitch direction actuator (both of which are not shown) provided in the blur correcting unit 104. In addition, the overall control unit 101 calculates the blur direction and the blur amount based on the blur detecting signal from the aforementioned blur detecting sensor 115 in the image stabilization mode. A blur correction control signal is generated based on the calculated direction and the blur amount and output to the blur correcting unit 104, and the main imaging element 102 is shifted to the direction in which the hand shaking can be offset.

The image signal obtained by the main imaging element 102 is subjected to analog signal processing by the signal processing unit 111, converted into digital image data by the A/D conversion circuit 112, and then input to the digital signal processing unit 113. The digital signal processing unit 113 performs digital signal processing for image creation such as black level correction, white balance (WB) adjustment, γ correction, and the like on the image data, and the image data is temporarily stored on the image memory 114. The image memory 114 provides a fast access and includes a capacity in which image data corresponding to a plurality of frames can be stored.

The main captured image data temporarily stored on the image memory 114 is appropriately subjected to image processing such as compression or the like by the overall control unit 101 and then stored on the memory card 118. In addition, the image data temporarily stored on the image memory 114 is appropriately displayed on the screen of the monitor 117 by the overall control unit 101. In so doing, the user such as a person who captures an image can reproduce confirmation display (after-view) which is for confirming the captured image and the captured images.

On the other hand, the sub imaging element 103 is an image sensor constituted by a solid-state imaging element such as a CCD, a CMOS, or the like and plays a role as an imaging elements which obtains an image relating to the object for live view (for the electronic finder) mainly before the main image capturing, namely an auxiliary captured image. Accordingly, the sub imaging element 103 can read an image with a smaller screen size and a small number of pixels at a higher speed as compared with the main imaging element 102. In addition, the sub imaging element 103 constantly obtains image data at a cycle of 60 images per a second, namely at 60 fps while the power of the imaging device 100 is input. The auxiliary captured image obtained by the sub imaging element 103 is output to the screen of the monitor 117 such as a liquid crystal panel, an EVF (Electronic View Finder), or the like, and the person who captures an image can use the auxiliary captured image for checking framing.

In addition, the sub imaging element 103 is provided with a photoelectric conversion cell which outputs a distance measurement signal for phase difference detection. When the main captured image is obtained by the main imaging element 102, it is possible to automatically perform focusing by detecting the focus state of the imaging lens with the use of this distance measurement signal. Alternatively, the distance measurement data can also be used for an application using the distance measurement data. The distance measurement data may be stored on the image memory 114 or the memory card 118 along with the main captured image.

The image signal obtained by the sub imaging element 103 is also subjected to analog signal processing by the signal processing unit 111, converted into digital image data by the A/D conversion circuit 112, and then input to the digital signal processing unit 113. The digital signal processing unit 113 performs digital signal processing for image creation such as black level correction, white balance (WB) adjustment, γ correction, and the like on the image data, and the image data is temporarily stored on the image memory 114.

The time-series image data obtained by the sub imaging element 103 and stored on the image memory 114 is displayed on the screen of the monitor 117 by the overall control unit 101. In so doing, the display (live view display) in the moving image state for checking framing is realized.

In addition, the blur correcting unit is not installed in the sub imaging element 103 according to this embodiment. It is possible to design whether or not the blur correcting unit is installed in any one of a plurality of imaging elements. In this embodiment, the blur correcting unit 104 is installed only in the main imaging element 102 since the space in the imaging device 100, in which the mechanism system can be disposed, is limited.

As described above, the sub imaging element 103 is provided with a photoelectric conversion cell which outputs a distance measurement signal for phase difference detection. For example, Japanese Unexamined Patent Application Publication No. 2009-192605 which has already been transferred to the present applicant discloses a photoelectric conversion cell and describes imaging elements for phase difference detection.

Here, description will be given of the configuration of the sub imaging element 103 with reference to FIGS. 2 and 3.

Figure 2:
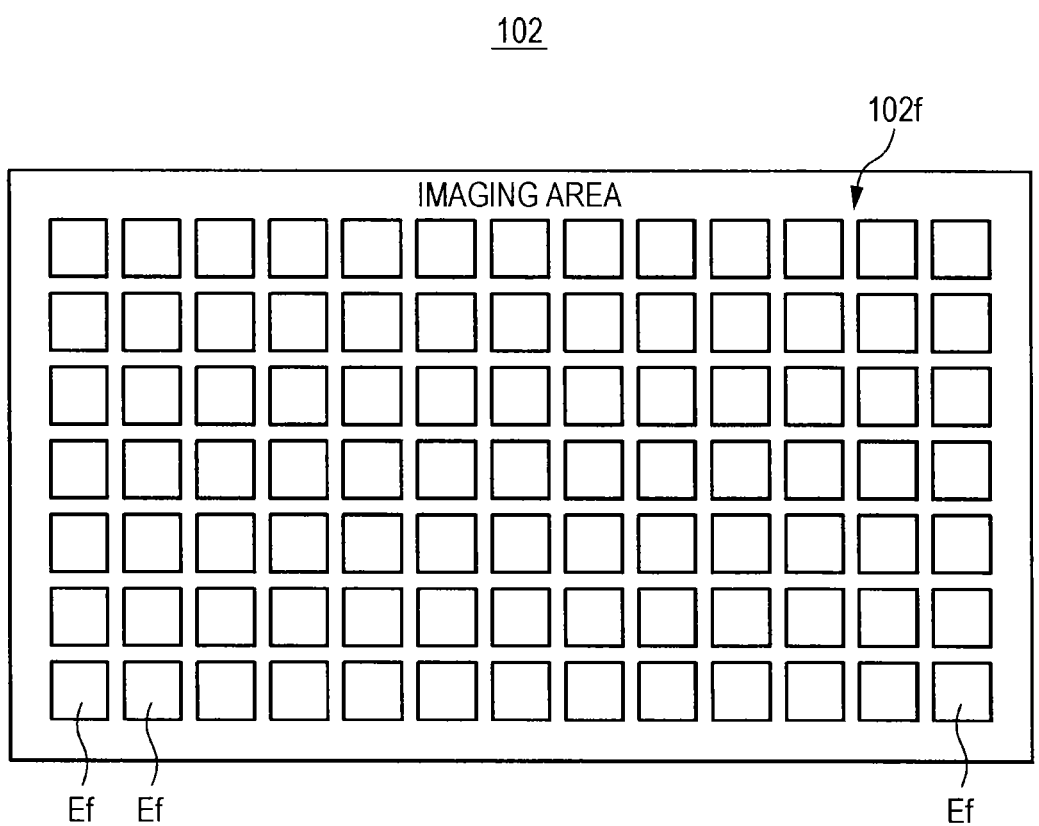
FIG. 2 is a diagram showing a configuration of an imaging plane of a sub imaging element.

FIG. 2 shows a configuration of the imaging plane 102$f$ of the sub imaging element 102. As shown in the drawing, the sub imaging element 102 includes a phase difference detecting area Ef which is defined in a matrix shape in the imaging plane 102$f$ and is capable of performing focus detection based on the phase difference detection scheme in each phase difference detecting area Ef.

Figure 3:
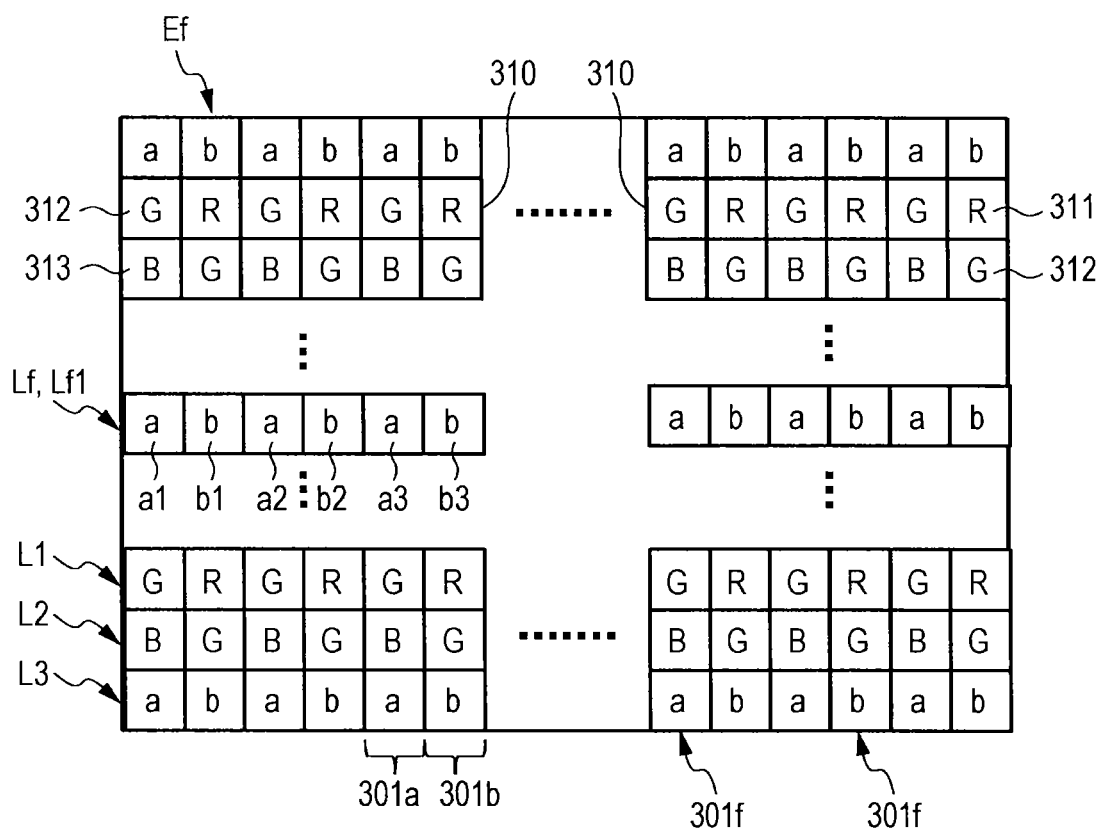
FIG. 3 is a diagram showing a configuration of a phase difference detecting area.

FIG. 3 shows a configuration of the phase difference detecting area Ef. As shown in the drawing, ordinary pixels (hereinafter, referred to as "ordinary pixels" or "imaging pixels") 310 including R pixels 311, G pixels 312, and B pixels 313, in each of which each color filter of R (red), G (green), and B (blue) is disposed on the photodiode, and pixels (hereinafter, referred to as a "phase difference detecting pixel") 301$f$ for phase difference AF are provided in the phase difference detecting area Ef.

In the phase difference detecting area Ef, Gr lines L1 in each of which G pixels 312 and R pixels 311 are alternately arranged in the horizontal direction as a horizontal line of the ordinary pixels and a Gb lines L2 in each of which B pixels 313 and G pixels 312 are alternately arranged in the horizontal direction are formed. A Bayer arrangement is constituted by alternately arranging the Gr lines L1 and the Gb lines L2 in the vertical direction.

In addition, phase difference detecting lines Lf in which a phase difference detecting pixel 301f is arranged in the horizontal direction for each 6 horizontal lines of the ordinary pixels, for example, are formed in the phase difference detecting area Ef. In addition, about 20 phase difference detecting lines Lf, for example, are provided in the phase difference detecting area Ef.

Figure 4:
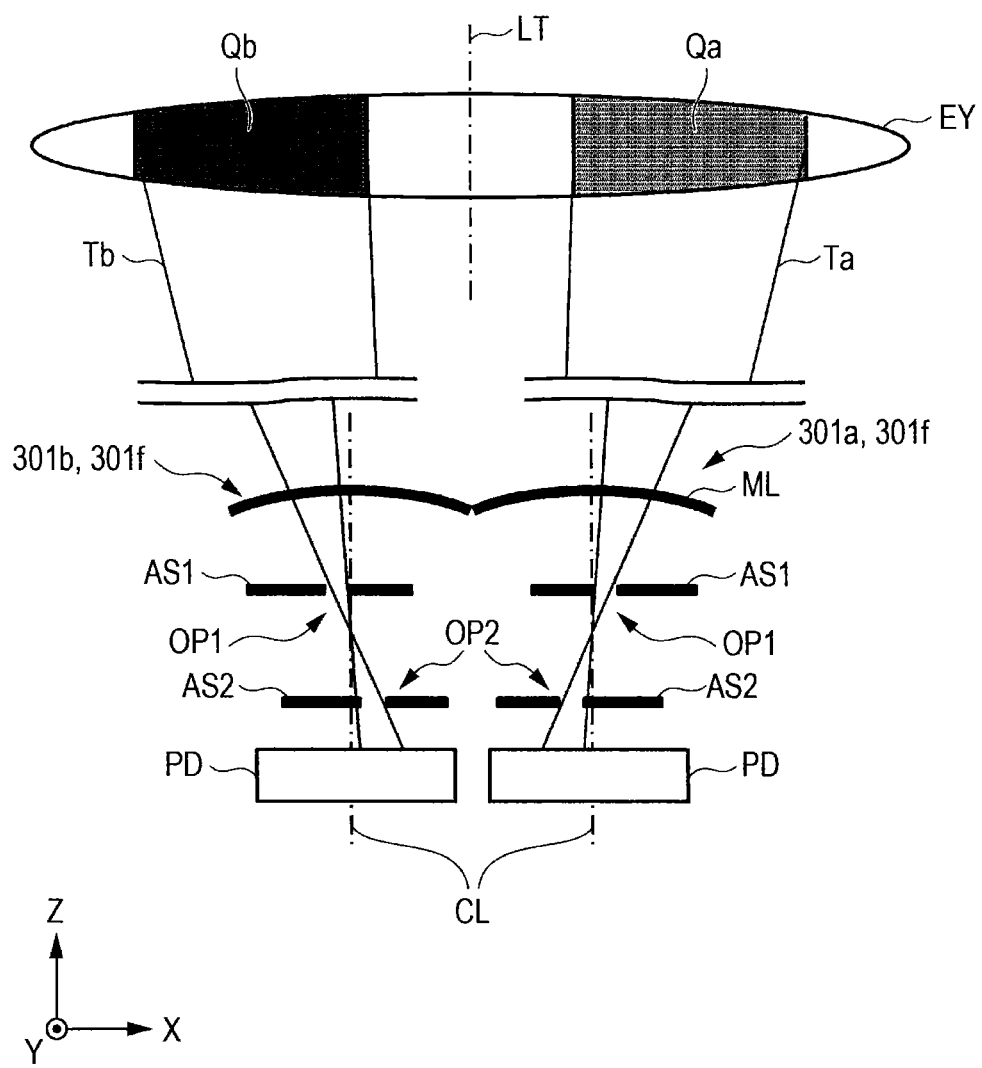
FIG. 4 is a longitudinal cross-sectional view of a pair of phase difference detecting pixels.

FIG. 4 shows a longitudinal cross-sectional view of a pair of phase difference detecting pixels. The phase difference detecting line Lf includes a plurality of pairs of phase difference detecting pixels 301a and 301b which receive object light by pupil splitting of the exit pupil EY of the image capturing optical system. As shown in FIG. 4, a pair of phase difference detecting pixels 310a and 301b which receives the light flux Ta from the right side (hereinafter, referred to as a "right partial pupil region" or simply as a "right pupil region") Qa and the light flux Tb from the left side (hereinafter, referred to as a "left partial pupil region" or simply as a "left pupil region") Qb of the exit pupil EY in the image capturing optical system are arranged in the horizontal direction in the phase difference detecting line Lf. In addition, +X direction is represented as the right side while −X direction is represented as the left side in the drawing.

One of the phase difference detecting pixel (hereinafter, referred to as a "first phase difference detecting pixel") 301a among a air of phase difference detecting pixels 301a and 301b is provided with a micro lens ML which collects incident light to the first phase difference detecting pixel 301a, a first light shielding plate AS1 with a slit-shaped (rectangular) first opening OP1, a second light shielding plate AS2 which is disposed under the first light shielding plate AS1 and includes a slit-shaped (rectangular) second opening OP2, and a photoelectric conversion unit PD.

In addition, the first opening OP1 in the first phase difference detecting pixel 301a is provided at a position slanting at a specific direction (here, the light direction (+X direction)) from a center axis CL, which passes through the center of the light receiving element PD and is parallel to the optical axis LT, as a reference (starting point). In addition, the second opening OP2 in the first phase difference detecting pixel 301a is provided at a position slanting in the direction opposite to the specific direction (hereinafter, referred to as a "opposite direction to the specific direction") from the center axis CL as a reference.

In addition, the other phase difference detecting pixel (hereinafter, referred to as a "second phase difference detecting pixel) 301b from among a pair of phase difference detecting pixels 301a and 301b is provided with a first light shielding plate AS1 with a slit-shaped first opening OP1 and a second light shielding plate AS2 which is disposed under the first light shielding plate AS1 and includes a slit-shaped second opening OP2. Moreover, the first opening OP1 in the second phase difference detecting pixel 301b is provided at a position slanting in the direction opposite to the specific direction from the center axis CL as a reference. In addition, the second opening OP2 in the second phase difference detecting pixel 301b is provided at a position slanting in the specific direction from the center axis CL as a reference.

That is, the first openings OP1 are disposed so as to be slant in mutually different directions in the pair of phase difference detecting pixels 301a and 301b. In addition, the second openings OP2 are arranged so as to be deviated in different directions with respect to the corresponding first openings OP1 in the phase difference detecting pixels 301a and 301b.

The pair of phase difference detecting pixels 301a and 301b with the above configuration obtains a distance measurement signal for the object light which has passed through different regions (parts) in the exit pupil EY. Specifically, the light flux Ta which has passed through the right pupil region Qa of the exit pupil EY passes through the micro lens ML and the first opening OP1 in the first light shielding plate AS1, is further restricted (limited) by the second light shielding plate AS2, and received by the light receiving element PD of the first phase difference detecting pixel 301a. Then, the distance measurement signal relating to the light flux Ta in the right pupil region Qa is obtained by the first phase difference detecting pixel 301a. In addition, the light flux Tb which has passed through the left pupil region Qb of the exit pupil EY passes through the micro lens ML and the first opening OP1 in the second light shielding plate AS2, further restricted by the second light shielding plate AS2, and then received by the light receiving element PD of the second phase difference detecting pixel 301b. Then, the distance measurement signal relating to the light flux Tb in the left pupil region Qb is obtained by the second phase difference detecting pixel 301b.

As described above, each of the light receiving elements PD in the pair of the phase difference detecting pixels 301a and 301b receives each of the light flux Ta and Tb of the object light which has passed through the right part and the left part (a pair of partial pupil regions) Qa and Qb in the exit pupil EY of the image capturing optical system, and the distance measurement signals in accordance with the received light flux Ta and Tb are generated by the light receiving elements PD.

However, the gist of the present disclosure is not necessarily limited to the above configuration of the distance measurement unit, and the sub imaging element 103 may have another configuration as long as it is possible to obtain the distance measurement signal at the same time as the image signal.

The imaging device 100 according to this embodiment can obtain distance measurement data for each pixel from the sub imaging element 103. It is possible to use an application using the measurement distance value for the captured image by recording such distance measurement data with the still image or the main captured image of the moving image obtained from the main imaging element 102. It is matter of course that the distance measurement data obtained from the sub imaging element 103 can be used for auto focusing in capturing an image by the main imaging element 102.

It is possible to obtain phase difference information for each pixel along with the image signal from the sub imaging element 103. It is possible to obtain phase difference information of each object included in the main captured image and expect to use the phase difference information to develop various applications if the main captured image obtained from the main imaging element 102 is associated with the auxiliary captured image obtained from the sub imaging element 103 and the phase difference information is recorded with the main captured image.

However, deviation between captured images obtained by the imaging elements 102 and 103 becomes a problem. When automatic focusing is performed with the distance information obtained by the sub imaging element 103, for example, precision to an extent where both captured images coincide with each other at a pixel level is not necessary. On the other hand, in the case of an application using the phase difference information for each object, there is a problem in that the phase difference information which is incorrect by the amount of deviation between captured images is applied to the object and it becomes difficult to achieve original effects of the application.

Here, the reason that the deviation occurs between the captured images of the main imaging element 102 and the sub imaging element 103 will be examined.

The description was already given of the configuration in which the sub imaging element reads an image with a small screen size and a small number of pixels at a higher frame rate as compared with the main imaging element 102. Accordingly, the timing of obtaining images is different between the main imaging element 102 and the sub imaging element 103. Therefore, deviation occurs between captured image since the speed of hand shaking of the person, who captured an image, in imaging is faster than the timing of obtaining the image.

The imaging device 100 shown in FIG. 1 mounts a blur correcting unit 104 only in the main imaging element 102. Since the image stabilization is performed only on the main captured image captured with hand shaking of the person who captures the image, deviation occurs between both captured images.

As described above, when the main captured image captured with handshaking of the person who captures the image at the time of capturing, which is obtained by the main imaging element 102 is associated with the auxiliary captured image obtained by the sub imaging element 103, and the phase difference information is recorded with the main captured image, the phase difference information is applied to the main captured image while being deviated by the amount of hand shaking.

Alternately, another method can be considered in which the electronic image stabilization is applied to the sub imaging element 103. The blur correcting unit 14 may shift the main imaging element 102 with the correction amount detected by the blur detecting sensor 115, and feedback of the correction amount is sent to the sub imaging element 103 to correct the cut position of the effective pixel region. Since the image obtaining timing is different between the main imaging element 102 and the sub imaging element 103, however, deviation occurs between both captured images even if image stabilization is performed when the speed of hand shaking of the person who captures the image at the time of capturing the image is faster than the image obtaining timing. In addition, a rounding error is generated due to the influence of the differences in the screen sizes and the numbers of pixels between the main imaging element 102 and the sub imaging element 103, and it is difficult to cancel the deviation between both captured images.

Even if the blur correcting units are installed both in the main imaging element 102 and the sub imaging element 103 unlike the configuration shown in FIG. 1, and image stabilization is performed on both captured images, a rounding error in the correction amount and an error in the amount of the displacement of the imaging elements by the blur correcting unit occur due the influence of the differences in the screen sizes and the number of pixels of imaging elements, and it is difficult to cancel the deviation between both captured images. Since the image obtaining timing is different between the main imaging element 102 and the sub imaging element 103, deviation occurs between both captured images even if image stabilization is performed when the speed of hand shaking of the person who captures the image at the time of capturing the image is faster than the image obtaining timing.

Thus, in this embodiment, the main captured image obtained by the main imaging element 102 is compared with the auxiliary captured image obtained by the sub imaging element 103, deviation in images is detected, deviation in the arrangement pf the phase difference information is also corrected by correcting the deviation in the images, and the main image is then associated with the phase difference information. In so doing, it is possible to apply precise phase difference information to the main captured image at a pixel level and store the main captured image. It is possible to obtain a captured image, in which precise phase difference information, namely distance information is embedded in each pixel, from the imaging device 100 and use such captured image with distance information for various applications.

Figure 5:
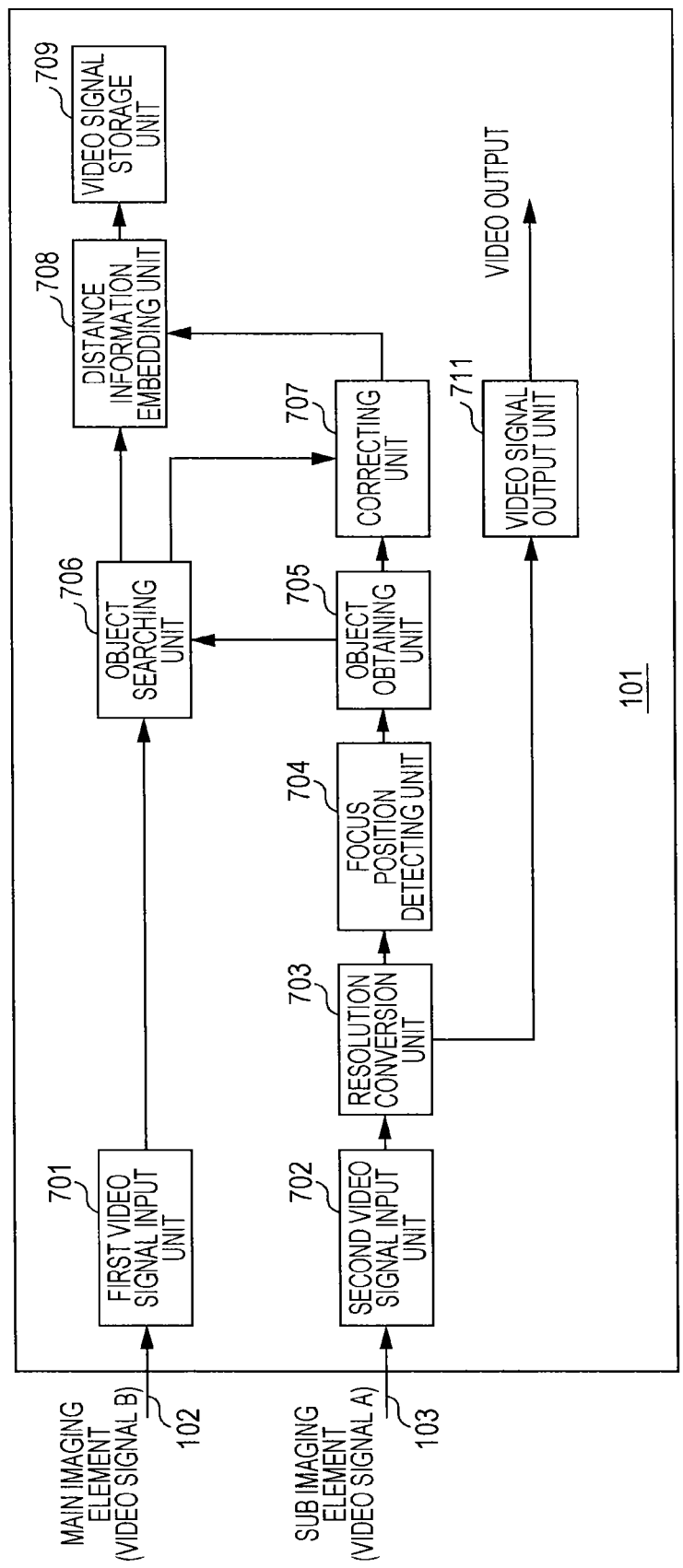
FIG. 5 is a diagram schematically showing a functional configuration of realizing video signal processing in which captured images by imaging elements are associated and recorded.

Such processing of associating and recording the captured images of the imaging elements 102 and 103 is realized as video signal processing by cooperation of the overall control unit 101 and each control unit, for example (however, the same video signal processing may be performed by a circuit module other than the overall control unit 101. FIG. 5 schematically shows a functional configuration which realizes such video signal processing. In addition, FIG. 6 shows a procedure of processing of associating and recording the captured images of the imaging elements 102 and 103 in the form of a flowchart.

Figure 6:
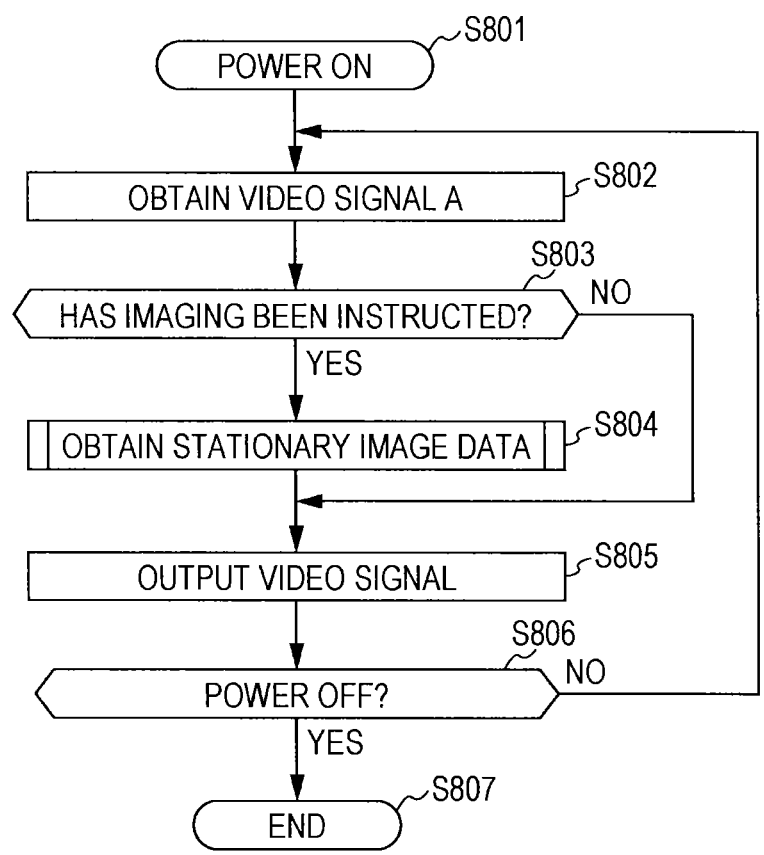
FIG. 6 is a flowchart showing a procedure of processing in which captured images by imaging elements are associated and recorded.

When the power of the imaging device 100 is turned on, the processing procedure shown in FIG. 6 is started (Step S801). The sub imaging element 103 reads a video signal A with phase difference information at a cycle of 60 fps in response to the drive control signal output by the timing control unit 106. Then, the video signal A is subjected to the digital signal processing for image creation such as black level correction, white balance adjustment, γ correction, and the like by the digital signal processing unit 113 and output from the second video signal input unit 702 (Step S802).

Here, if image capturing is instructed by the person who captures an image by operating a release button by the operating unit 119, for example (Yes in Step S803), stationary image data obtaining processing which has separately been defined is executed (Step S804). The detailed description will be given of the stationary image data obtaining processing.

After the stationary image data obtaining processing is completed in Step S804, or when the image capturing has not been instructed by the person who captures an image (No in Step S803), the signal after the signal processing is transferred to the video signal output unit 711 and the subjected to output processing (Step S805).

In the video signal output unit 711 performs resolution conversion processing in accordance with the device for output in the later stage on the video signal A. For example, when a liquid crystal panel if VGA (Video Graphic Array) output is connected as a destination of output of the video signal output unit 711, the resolution converting unit 703 converts the resolution into 640×480. In addition, when a television compatible with full HD (High Definition) output is connected, the resolution converting unit 703 converts the resolution into 1920×1080.

In addition, the video signal output unit 711 performs format conversion processing in accordance with the device for output in the later stage on the video signal A. For example, when a liquid crystal panel of parallel signal input is connected as a destination of output of the video signal output unit 711, conversion into a parallel format is performed. Moreover, when a television capable of HDMI (High-Definition Multimedia Interface) connection is connected, conversion into HDMI format is performed.

The person who captures an image can perform framing while checking the display screen output from the video signal output unit 711.

Until the power of the imaging device 100 is turned off (No in Step S806), the above processing Step S802 to S805 is repeatedly executed. Then, when the power of the imaging device 100 is turned off (Yes in Step S806), this processing routine is completed (Step S807).

Figure 7:
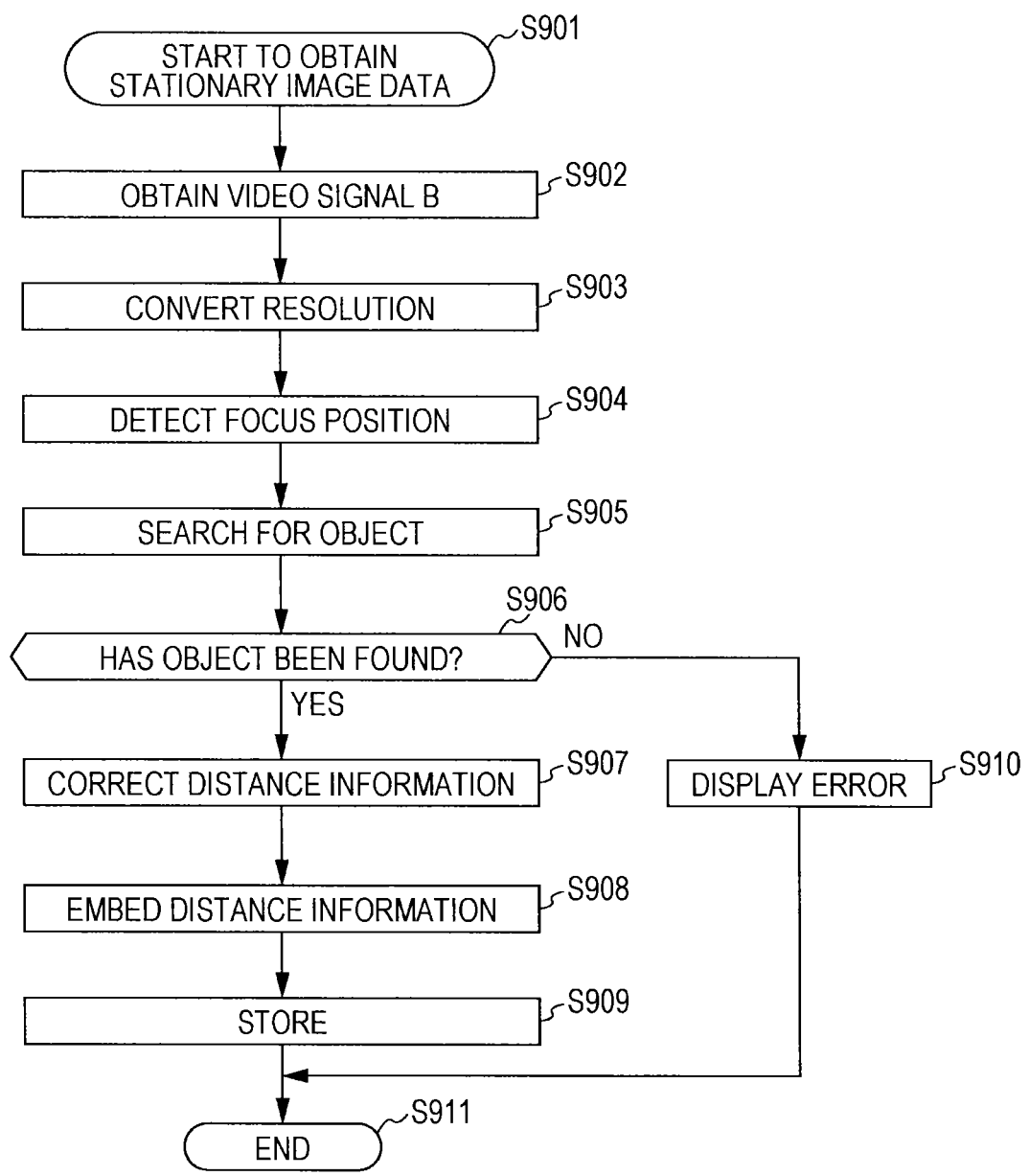
FIG. 7 is a flowchart showing a detailed procedure of stationary image data obtaining processing executed in Step S804 in the flowchart shown in FIG. 6.

FIG. 7 shows a detailed processing procedure of the stationary image data obtaining processing executed in Step S804 in the flowchart shown in FIG. 6 in the form of a flowchart.

This processing is started in response to the instruction of image capturing from the person who captures an image, for example when the release button is operated by the operating unit 119 (Step S901).

The timing control unit 106 outputs a driving control signal at timing of instruction of image capturing by the person who captures an image. A video signal B corresponding to the main captured image is read from the main imaging element 102 in response to the driving control signal. It is assumed that the blur correcting unit 104 is installed on the main imaging element 102 and the video signal B does not include hand shaking. Then, the digital signal processing unit 113 performs digital signal processing for image creation such as black level correction, white balance adjustment, γ correction, and the like on the video signal B, and the video signal B is then input from the first video signal input unit 701 (Step S902).

Then, the second video signal input unit 702 transfers the video signal A with the input phase difference information to the resolution conversion unit 703. The resolution conversion unit 703 performs resolution conversion on the video signal A so as to have the same resolution as that of the video signal B (Step S903). In addition, the same interpolation processing is performed on the phase difference information attached to the video signal A, namely the distance measurement data when the resolution is converted.

Here, as methods of converting resolution, digital image enlarging algorithms such as a bilinear (linear interpolation) method, a bicubic method, and the like are exemplified. However, the gist of the present disclosure is not limited to a specific resolution conversion algorithm.

The video signal A after the resolution conversion is transferred to the focus position detecting unit 704 and subjected to focus position detecting processing (Step S904). The focus position detecting unit 704 can obtain the focus position by detecting the location with the highest contrast in the image transferred from the resolution conversion unit 703, for example. When the detection of the focus position is completed, the focus position information is transferred to the object obtaining unit 705 along with the image data and the distance measurement data.

The object obtaining unit 705 extracts an object included in the image data based on the focus position information and the distance measurement data obtained from the focus position detecting unit 704. Then, the object searching unit 706 searches for the same object in the video signal B as the main captured image (Step S905).

Figure 8:
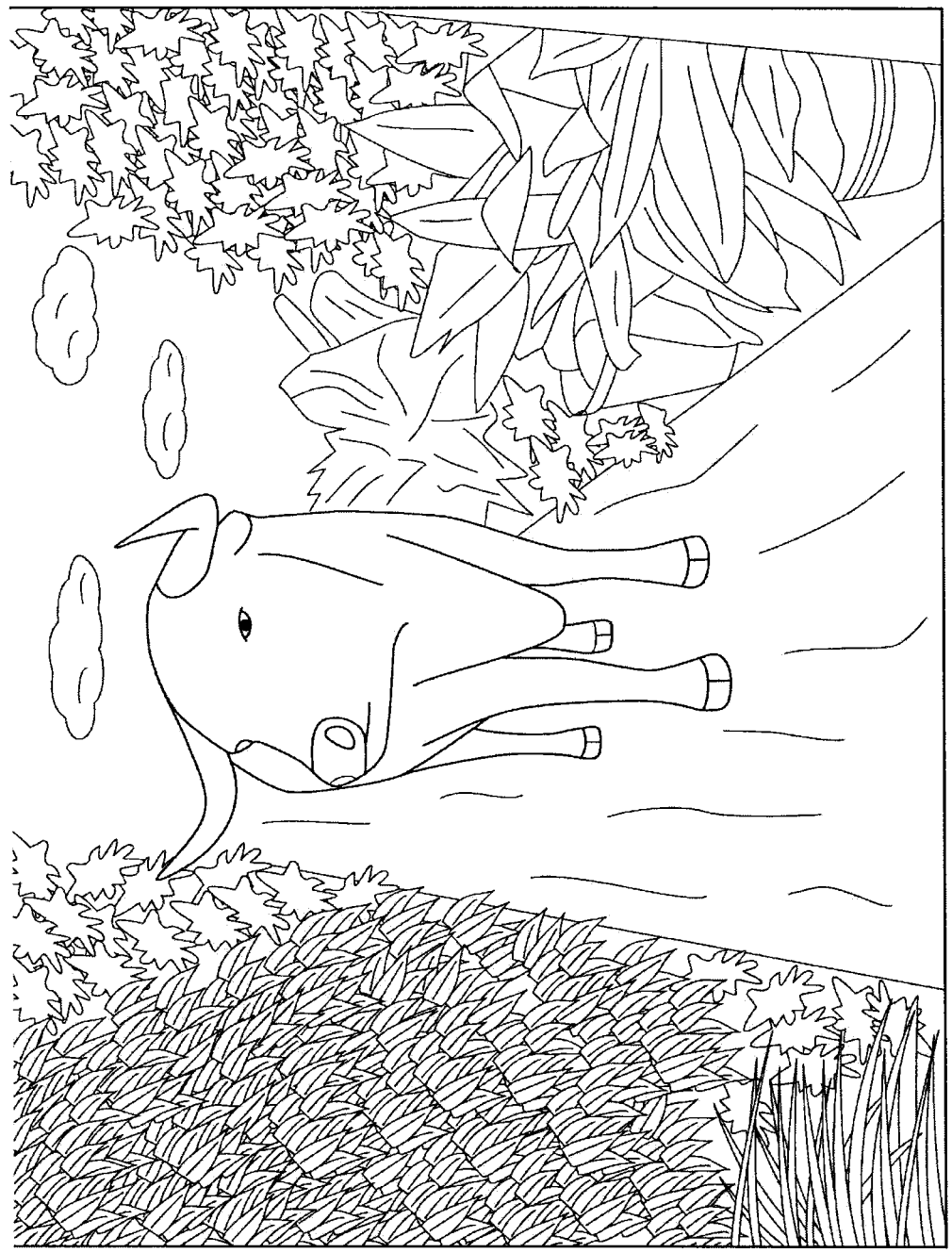
FIG. 8 is a diagram showing an example of a main captured image (video signal B) obtained by a main imaging element.
Figure 9:
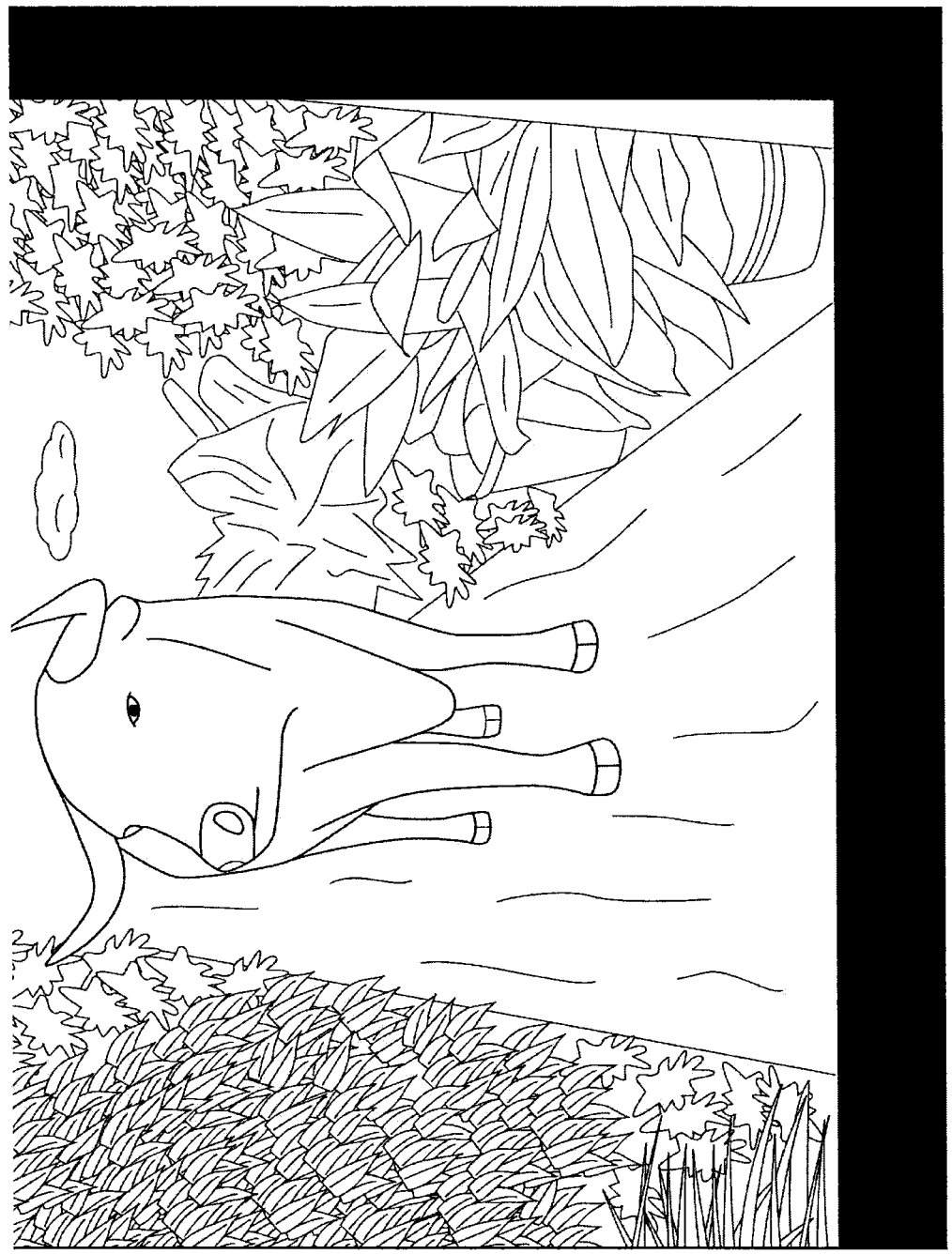
FIG. 9 is a diagram showing an auxiliary captured image (video signal A), which is obtained by a sub imaging element, corresponding to the main captured image shown in FIG. 8.

Here, a specific example of the object searching processing will be described. FIG. 8 shows the main captured image (vide signal B) obtained by the main imaging element 102, and FIG. 9 shows the auxiliary captured image (video signal A) obtained by the sub imaging element 103. No blur is in the video signal B since the main imaging element 102 is subjected to image stabilization while blur is included in the vide signal A since the sub imaging element 103 is not subjected to image stabilization. In addition, difference in image capturing timing, differences in screen sizes, the numbers of pixels, and pixel pitches as well as hand shaking affects deviation between both captured images.

Figure 10:
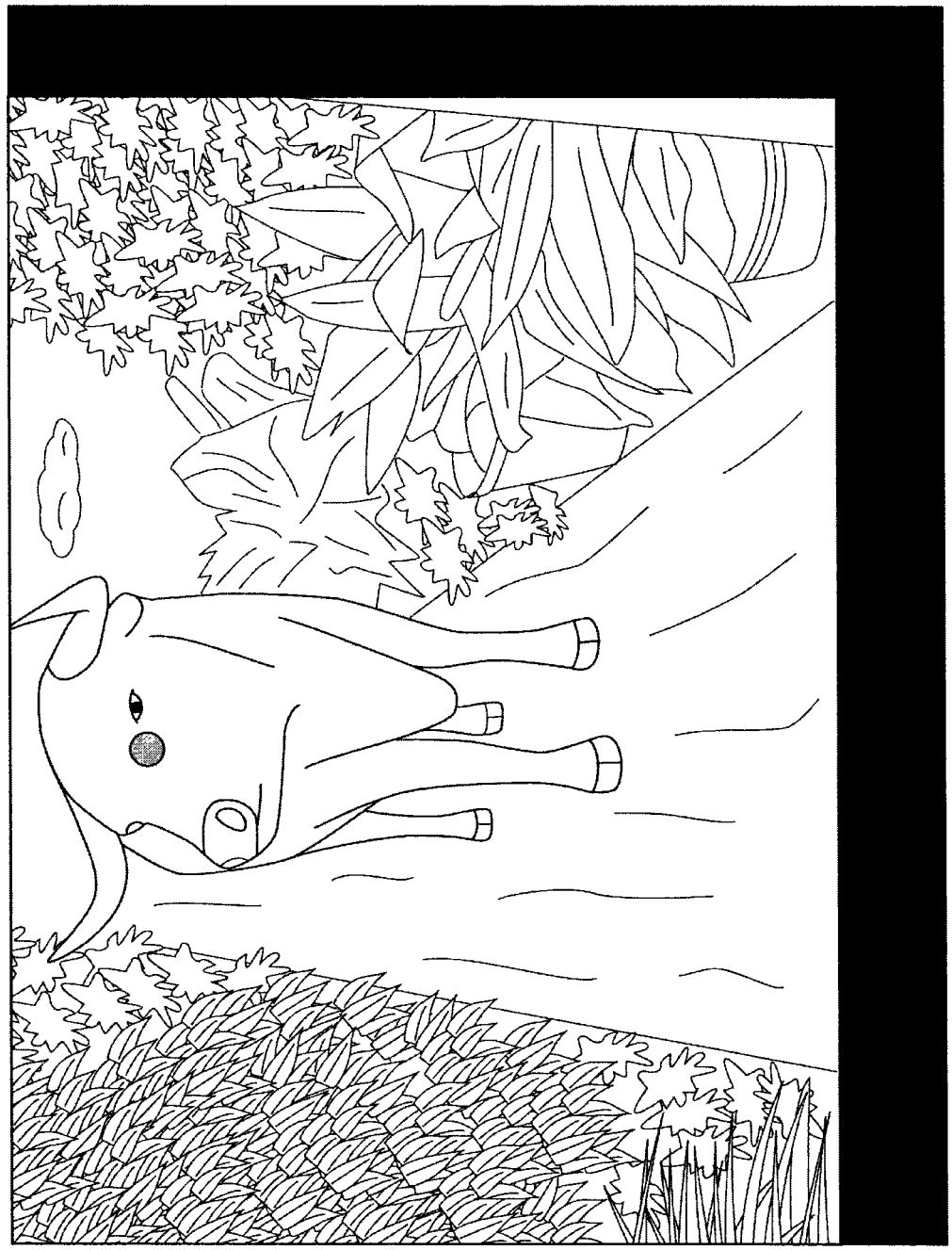
FIG. 10 is a diagram showing a state where a focus position is detected in the auxiliary captured image shown in FIG. 9.

FIG. 10 shows a state in which the focus position detecting unit 704 detects the focus position from the video signal A shown in FIG. 9. In FIG. 10, the spot shown substantially at the center of the face of the cow corresponds to the position where the focus position is detected.

Figure 11:
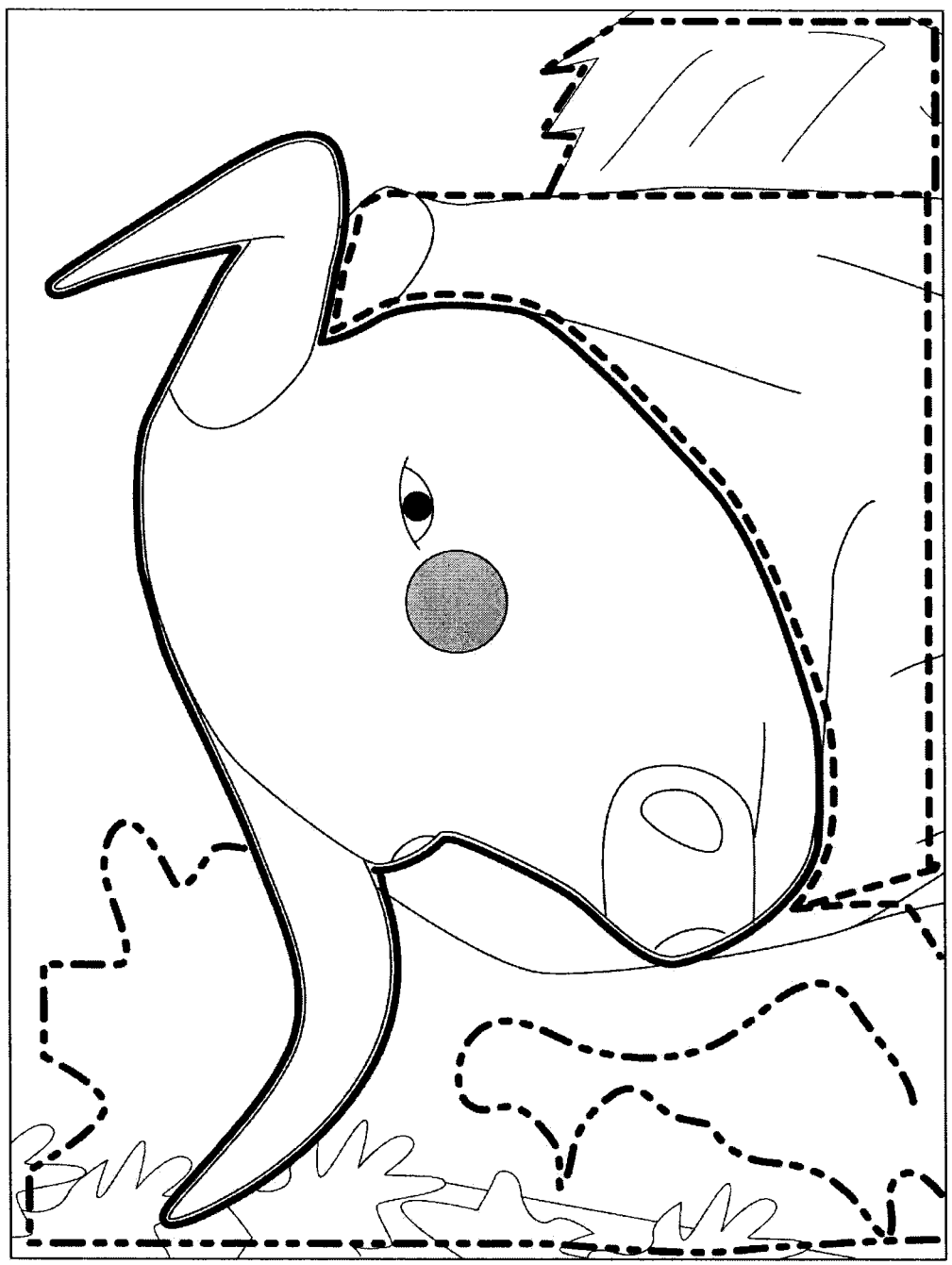
FIG. 11 is a diagram showing a result of edge detection performed on the auxiliary captured image shown in FIG. 9.

The object obtaining unit 705 obtains edge information by applying edge detection processing to the video signal A. FIG. 11 shows the edge information extracted near the face of the cow in the image shown in FIG. 10. In the example shown in FIG. 11, three edge information items surrounded by a solid line, a dotted line, and a one-dotted chain line are obtained. Then, the region surrounded by the solid line, which includes the focus position, in the obtained edge region is extracted as an object. It is possible to expect the enhancement in search precision and a search speed by using the object near the focus position as a searched object by the object searching unit 706 as described above.

Figure 12:
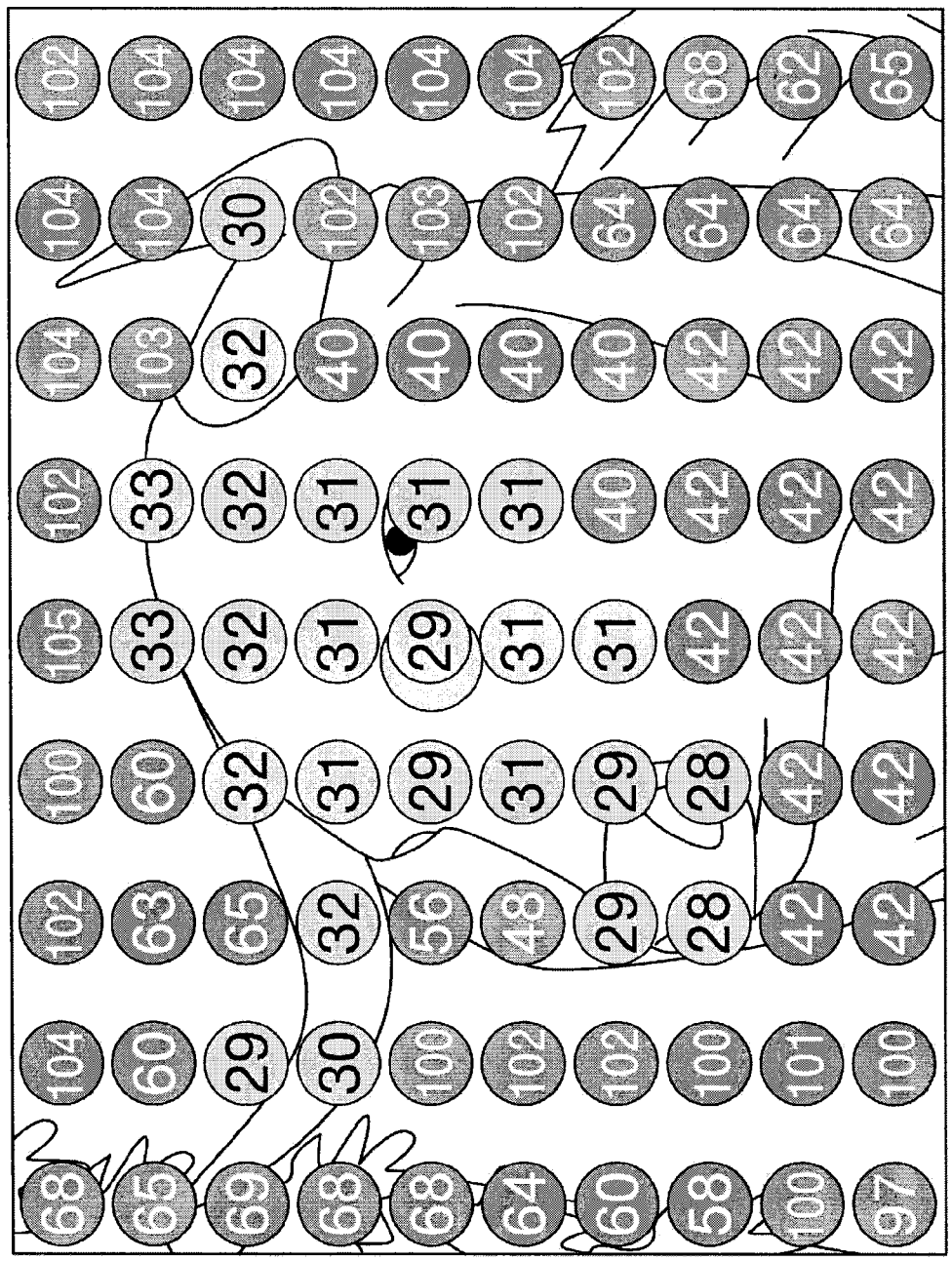
FIG. 12 is a diagram showing distance measurement data superimposed on an auxiliary captured image.

In addition, the object obtaining unit 705 obtains the object not only by the edge detection but also with the use of the distance measurement data included in the video signal A. FIG. 12 shows the distance measurement data for each pixel super imposed on the video signal A. However, the distance measurement value is represented by 7 bits (namely, a value from 0 to 127). The object obtaining unit 705 can obtain the object by determining a part with the similar distance in the distance measurement data (that is, a part near the focus position, in which the difference in the distance measurement data from the focus position is within a predetermined range) to be the same object region based on the distance measurement data near the focus position. In the example shown in FIG. 12, the distance measurement value of the pixel at the focus position is 29, and the pixels near the pixel at the focus position, whose distance measurement values are within the range from 29 to 33, are extracted as the pixels pf the same object. Here, if the range of the distance measurement values which can be regarded as the same object is set to be excessively narrow, it becomes difficult to obtain the object. If the range is set to be excessively wide, the obtained object becomes too large, and the burden in the pattern matching processing performed by the object searching unit 706 in the later stage is increased. Some patterns may be tried to preset an optimal value for the range of the distance measurement value which is regarded as the same object. Alternatively, a configuration is also applicable in which the setting of this value can be changed in the desired recognition level on the side of a user such as a person who captures an image.

The technique for obtaining an object has been widely used in this field. The gist of the present disclosure is not limited to an object obtaining method using edge detection or distance measurement data, and it is also possible to apply another existing technique.

The object obtained in the video signal A by the object obtaining unit 705 is transferred as the searched object to the object searching unit 706. The object obtaining unit 705 computes the gravity center position of the obtained object and transfers the result to the correcting unit 707.

The object searching unit 706 searches for whether or not the same object is present in the video signal B based on the searched object transferred from the object obtaining unit 705. As a method of searching for the object, it is possible to apply a general method such as pattern matching, for example. Then, it is determined whether or not the searched object has been found in the video signal B (Step S906).

When the searched object has been fond in the video signal B (Yes in Step S906), the object searching unit 706 computes the gravity center position of the object image position in the main captured image obtained from the first video signal input unit 701 and transfers the gravity center position as position correcting information to the correcting unit 707. In addition, the object searching unit 706 transfers the main captured image to the distance information embedding unit 708 in the later stage.

The correcting unit 707 corrects the distance information included in the video signal A based on the position correcting information obtained from the object searching unit 706 (Step S907). In this processing step, the correcting unit 707 calculates the positional deviation between images from the gravity center position of the object in the auxiliary captured image obtained from the object obtaining unit 705 and the gravity center position of the same object in the main captured image obtained from the object searching unit 706.

Figure 13:
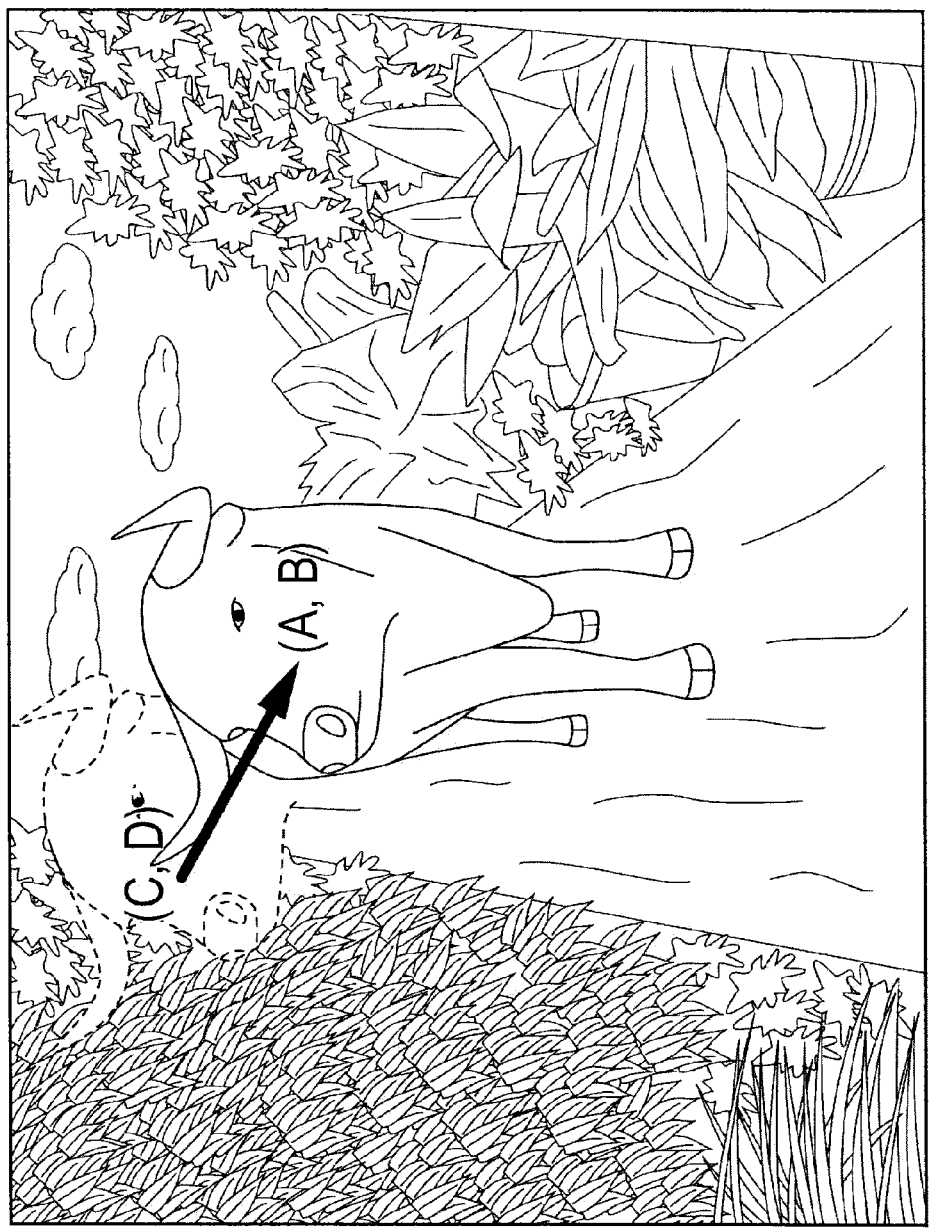
FIG. 13 is a diagram showing a state where distance information is corrected.

FIG. 13 shows a state in which the distance information is corrected. In the drawing, the gravity center position of the object in the auxiliary captured image obtained from the object obtaining unit 705 is expressed as (A, B), and the gravity center position of the same object in the auxiliary captured image obtained from the object searching unit 706 is expressed as (C, D). In such a case, it is possible to correct the position by adding A-C in the X direction and B-D in the Y direction to each pixel of the auxiliary captured image obtained from the sub imaging element 103. By such correction, it is possible to cancel the deviation between the captured images resulting from the differences in the screen sizes, the numbers of pixels, and the pixel pitches for each imaging element, inconsistency in image timing, an application of image stabilization only to a part of imaging elements, and the like. The correcting unit 707 similarly moves distance information from each point as well as the pixel value for each pixel and transfers the distance information to the distance information embedding unit 708 as distance information after the position correction.

Here, when the correction as shown in FIG. 13 is applied to the distance information, the distance information of the circumference which has moved to the outside of the effective pixel region of the main captured image by the amount of blur in the auxiliary captured image is not obtained. Although distance information is not arranged in the circumference of the main captured image, it is considered that there is no substantial problem because an important object is generally present near the center of the main captured image.

The distance information embedding unit 708 performs embedding processing of corrected distance information obtained from the correcting unit 707 into the main captured image obtained from the object searching unit 706 (Step S908). As a method of embedding distance information, it is possible to consider a method of describing distance information at each coordinate in the header part of the image data, a method of compressing the image data by a JPEG (Joint Picture Experts Group) compressing unit in the distance information embedding unit 708 in a JPEG format and writing distance information at each coordinate in Exif (Exchangeable Image File format) or the like as metadata, and the like. In addition, the distance information embedding unit 708 transfers the main captured image in which the distance information has been embedded to the video signal recording unit 709.

The video signal recording unit 709 records the main captured image obtained from the distance information embedding unit 708 (Step S909). For example, the image file in which the main captured image has converted into the JPEG format and the distance information is embedded in the Exif format in the previous Step S908 is recorded in Step S909, and the stationary image data obtaining processing is completed (Step S911).

In addition, as an apparatus which records the image file, it is possible to exemplify a magnetic recording apparatus such as a hard disk or the like built in the imaging device 100, a semiconductor memory such as a flash memory, a detachable optical disk (all of which are not shown in FIG. 1), an external server (not shown) connected as a network through the memory card 118 and the communication interface 122, and the like. The recording file format is not particularly limited.

On the other hand, when the searched object has not been found in the video signal B (No in Step S906), an error message indicating that the same object has not been detected in the main captured image or that the distance information has not been embedded in the main captured image is displayed (Step S910).

Here, it is considered that the searched object has not been found in Step S906 because of large hand shaking or large difference between the main captured image and the auxiliary captured image due to some reason. Since appropriate distance information is not embedded in to the main captured image in such a case, an error message is displayed in Step S910. In addition, recording of the main captured image may be stopped. Alternatively, the distance information embedding unit 708 may transfer and record the main captured image as it is to the video signal recording unit 709 without performing the aforementioned position correction for the distance information and distance information embedding processing (Step S909).

According to the functional configuration shown in FIG. 5 and processing procedures shown in FIGS. 6 and 7, the imaging device 100 can appropriately associate and record at a pixel level the main captured image, which is obtained by the main imaging element 102 and subjected to the image stabilization, with the auxiliary captured image with the phase difference information obtained from the sub imaging element 103 by canceling the deviation between the captured images resulting from the differences in the screen sizes, the numbers of pixels, and the pixel pitches for each imaging element, inconsistency in image capturing timing, an application of image stabilization only to a part of the imaging elements, and the like.

When the distance information obtained by the sub imaging element 103 provided with the phase difference detecting pixels is applied to an application such as an image capturing assist or the like, the application may be applied after obtaining the distance information corrected by the correcting unit 707. It is possible to enhance the precision of the applied application by using the corrected distance information on the basis of the main captured image.

The present disclosure contains subject matter related to that disclosed in Japanese Priority Patent Application JP 2010-262068 filed in the Japan Patent Office on Nov. 25, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
   a first imaging unit which does not include a phase difference detecting pixel on an imaging element;
   a second imaging unit which includes a phase difference detecting pixel on an imaging element;
   an image comparing unit which compares a first obtained image obtained by the first imaging unit with a second obtained image obtained by the second imaging unit;

a correcting unit which corrects phase difference information obtained by the second imaging unit based on a comparison result by the image comparing unit;

a phase difference applying unit which applies the phase difference information corrected by the correcting unit to the first obtained image; and a recording unit which records image information, wherein the first imaging unit is provided with a hand shaking correcting function while the second imaging unit is not provided with the hand shaking correcting function.

2. The imaging device according to claim 1, wherein the recording unit records the phase difference information with the image information.

3. The imaging device according to claim 1, wherein the image comparing unit detects deviation between the first obtained image for which hand shaking has been corrected and the second obtained image for which hand shaking has not been corrected.

4. The imaging device according to claim 1, wherein the hand shaking correcting function is for performing hand shaking correction based on a imager shift scheme, and wherein the image comparing unit detects deviation between the first obtained image and the second obtained image resulting from a computation error of a displacement amount or a displacement error of imaging elements at the time of hand shaking correction.

5. The imaging device according to claim 1, wherein the image comparing unit detects deviation between images resulting from sizes of imaging elements, numbers of pixels, or pixel pitches of the first and second imaging units.

6. The imaging device according to claim 1, wherein the image comparing unit detects deviation between the first obtained image and the second obtained image resulting from a difference in obtaining timing of imaging elements in the first and second imaging units.

7. An image processing method comprising:

comparing a first obtained image obtained by a first imaging unit which does not include a phase difference detecting pixel on an imaging element with a second obtained image obtained by a second imaging unit which includes a phase difference detecting pixel on an imaging element;

correcting phase difference information obtained by the second imaging unit based on a comparison result of image comparison; and applying the phase difference information corrected in the correction to the first obtained image, wherein the first imaging unit is provided with a hand shaking correcting function while the second imaging unit is not provided with the hand shaking correcting function.

8. The imaging processing method according to claim 7, wherein comparing includes detecting deviation between the first obtained image for which hand shaking has been corrected and the second obtained image for which hand shaking has not been corrected.

9. A non-transitory computer-readable medium storing a computer program which causes a computer to execute the following steps:

comparing a first obtained image obtained by a first imaging unit which does not include a phase difference detecting pixel on an imaging element with a second obtained image obtained by a second imaging unit which includes a phase difference detecting pixel on an imaging element;

correcting phase difference information obtained by the second imaging unit based on a comparison result of image comparison; and applying the phase difference information corrected in the correction to the first obtained image, wherein the first imaging unit is provided with a hand shaking correcting function while the second imaging unit is not provided with the hand shaking correcting function.

10. The non-transitory computer-readable medium according to claim 9, wherein comparing includes detecting deviation between the first obtained image for which hand shaking has been corrected and the second obtained image for which hand shaking has not been corrected.

* * * * *